United States Patent
Shin et al.

(10) Patent No.: US 11,340,506 B2
(45) Date of Patent: May 24, 2022

(54) LIQUID CRYSTAL DISPLAY

(71) Applicant: Samsung Display Co., Ltd., Yongin-Si (KR)

(72) Inventors: Dong Hee Shin, Asan-si (KR); Geun Ho Lee, Hwaseong-si (KR); Yong Hee Lee, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/147,359

(22) Filed: Jan. 12, 2021

(65) Prior Publication Data
US 2021/0318570 A1  Oct. 14, 2021

(30) Foreign Application Priority Data
Apr. 14, 2020  (KR) .................. 10-2020-0045190

(51) Int. Cl.
| | | |
|---|---|---|
| G02F 1/136 | (2006.01) | |
| G02F 1/1362 | (2006.01) | |
| G02F 1/1368 | (2006.01) | |
| G02F 1/1343 | (2006.01) | |

(52) U.S. Cl.
CPC ........ *G02F 1/13606* (2021.01); *G02F 1/1368* (2013.01); *G02F 1/134309* (2013.01); *G02F 1/136286* (2013.01); *G02F 2201/123* (2013.01)

(58) Field of Classification Search
None
See application file for complete search history.

(56) References Cited

U.S. PATENT DOCUMENTS

| | | | | |
|---|---|---|---|---|
| 8,482,709 B2* | 7/2013 | Shin | .................. | G02F 1/133753 349/129 |
| 2007/0109482 A1* | 5/2007 | Kim | ..................... | G02F 1/1393 349/144 |
| 2007/0296879 A1* | 12/2007 | Lin | ................... | G02F 1/136213 349/38 |
| 2009/0244425 A1* | 10/2009 | Jung | ..................... | G02F 1/1337 349/48 |
| 2011/0121303 A1* | 5/2011 | Kim | .................. | G02F 1/136213 257/59 |

(Continued)

FOREIGN PATENT DOCUMENTS

| | | |
|---|---|---|
| KR | 10-1675372 B1 | 11/2016 |
| KR | 10-1973584 B1 | 4/2019 |

(Continued)

*Primary Examiner* — Ryan Crockett
(74) *Attorney, Agent, or Firm* — Innovation Counsel LLP (57) ABSTRACT

A liquid crystal display includes a first data line, a second data line, and a pixel electrode. The first data line transmits a first data voltage when the second data line transmits a second data voltage. A polarity of the second data voltage is opposite to a polarity of the first data voltage. The pixel electrode includes a first branch, a second branch, a third branch, and a fourth branch. The first branch is between the first data line and the second data line. The second branch neighbors the first branch in a first direction and overlaps the second data line. The third branch neighbors the first branch in a second direction and overlaps the first data line. The fourth branch neighbors the third branch in the first direction, neighbors the second branch in the second direction, and is between the first data line and the second data line.

19 Claims, 6 Drawing Sheets

(56) References Cited

U.S. PATENT DOCUMENTS

| | | | | |
|---|---|---|---|---|
| 2012/0307190 A1* | 12/2012 | Zhang | ............... | G02F 1/133707 |
| | | | | 349/142 |
| 2016/0147119 A1* | 5/2016 | Chang | ............... | G02F 1/134336 |
| | | | | 349/33 |
| 2020/0348571 A1* | 11/2020 | Ryu | ................... | G02F 1/136286 |
| 2021/0173271 A1* | 6/2021 | Long | ..................... | H01L 27/124 |

FOREIGN PATENT DOCUMENTS

| KR | 10-2019-0115141 A | 10/2019 |
|---|---|---|
| KR | 10-2019-0122921 A | 10/2019 |

\* cited by examiner

LIQUID CRYSTAL DISPLAY

CROSS-REFERENCE TO RELATED APPLICATION

This application claims priority to and the benefit of Korean Patent Application No. 10-2020-0045190 filed in the Korean Intellectual Property Office on Apr. 14, 2020; the Korean Patent Application is incorporated herein by reference.

BACKGROUND

1. Field

The technical field relates to a liquid crystal display.

2. Description of the Related Art

A liquid crystal display typically includes a pixel electrode, a common electrode, and a liquid crystal layer. The liquid crystal display displays an image by applying at least one voltage to the pixel electrode and the common electrode to generate an electric field in the liquid crystal layer, thereby controlling orientations of liquid crystal molecules of the liquid crystal layer to control transmission of incident light.

In the liquid crystal display, in order to prevent a degradation of the liquid crystal layer potentially caused by applying a unidirectional electric field for a long time, a polarity of a data voltage (with respect to a common voltage) for each pixel column may be reversed. As a result, an electric field charged in the liquid crystal layer by parasitic capacitance between the pixel electrode and a data line adjacent to the pixel electrode may be changed. Therefore, image display quality of the liquid crystal display may deteriorate.

If a distance between the pixel electrode and the data line is increased to reduce the parasitic capacitance, an aperture ratio undesirably decreases.

The above information disclosed in this Background section is for enhancement of understanding of the background of the described technology. This Background section may contain information that is not prior art already known in this country to a person of ordinary skill in the art.

SUMMARY

Embodiments may reduce influence of a deviation of parasitic capacitance between a pixel electrode and a data line without substantially reducing an aperture ratio in a liquid crystal display.

An embodiment may be related a liquid crystal display that includes the following elements: first and second data lines that transmit data voltages of different polarities and are disposed adjacent to each other; and a pixel electrode disposed between the first data line and the second data line in a plan view and including four sub-regions, wherein among the four sub-regions of the pixel electrode, two sub-regions diagonally disposed to each other may overlap a portion of the first data line and a portion of the second data line; and among the four sub-regions of the pixel electrode, the remaining two sub-regions diagonally disposed to each other may not overlap the first data line and the second data line.

The pixel electrode may include: a horizontal stem portion extending in a first direction; a first vertical stem portion and a second vertical stem portion extending upward and downward from the horizontal stem portion in a direction parallel to a second direction different from the first direction; an outer stem portion extending from the horizontal stem portion and the first vertical stem portion and the second vertical stem portion to be disposed at an outer portion of the pixel electrode; and a first branch electrode, a second branch electrode, a third branch electrode, and a fourth branch electrode that are disposed between the horizontal stem portion, the first vertical stem portion, the second vertical stem portion, and the outer stem portion and extend in different directions.

The first vertical stem portion and the second vertical stem portion may not be aligned in a line along the second direction, but may be misaligned.

A separation distance between a first line connecting an edge of the first vertical stem portion along the second direction and a second line connecting an edge of the second vertical stem portion along the second direction may be substantially equal to a sum of a width of the first vertical stem portion and a width of the first data line.

The four sub-regions may include a first sub-region including the first branch electrode, a second sub-region including the second branch electrode, a third sub-region including the third branch electrode, and a fourth sub-region including the fourth branch electrode; the first sub-region and the fourth sub-region may be diagonally disposed to each other; and the second sub-region and the third sub-region may be diagonally disposed to each other.

The first data line and the second data line may extend in a second direction; and the first data line and the second data line may include a first vertical portion and a second vertical portion extending in the second direction, and may include a horizontal portion extending in a first direction different from the second direction and disposed between the first vertical portion and the second vertical portion.

The pixel electrode may be electrically connected to a source electrode of the second data line, the second sub-region may overlap the first vertical portion of the second data line, and the third sub-region may overlap the second vertical portion of the first data line.

The horizontal portion may overlap the horizontal stem portion.

An overlapping area of the second sub-region and the first vertical portion of the second data line may be substantially the same as that of the third sub-region and the second vertical portion of the first data line.

An area of the second sub-region and an area of the third sub-region may be substantially the same, and an area of the first sub-region and an area of the fourth sub-region may be substantially the same.

The area of the second sub-region and the area of the third sub-region may be larger than the area of the first sub-region and the area of the fourth sub-region.

An embodiment may be related to a liquid crystal display that includes the following elements: a first data line that transmits a data voltage of a first polarity and includes a first vertical portion and a second vertical portion, a first horizontal portion disposed between the first vertical portion and the second vertical portion, and a first source electrode; a second data line that transmits a data voltage of a second polarity opposite to the first polarity and includes a third vertical section and a fourth vertical section, a second horizontal portion disposed between the third vertical portion and the fourth vertical portion, and a second source electrode; and a pixel electrode disposed between the first data line and the second data line in a plan view, wherein in the plan view, the first vertical portion of the first data line and the third vertical portion of the second data line may face each other with the pixel electrode therebetween; the second vertical portion of the first data line and the fourth vertical portion of the second data line may face each other with the pixel electrode therebetween; and the pixel electrode may overlap the second vertical portion of the first data line and the third vertical portion of the second data line.

The pixel electrode may be electrically connected to the first source electrode of the first data line.

The first horizontal portion and the second horizontal portion may overlap a horizontal stem portion of the pixel electrode.

The pixel electrode may include a first vertical stem portion and a second vertical stem portion extending upward and downward from the horizontal stem portion, and the first vertical stem portion and the second vertical stem portion may not be aligned in a line with each other along a direction perpendicular to the horizontal stem portion.

An overlapping area of the pixel electrode and the second vertical portion of the first data line may be substantially the same as that of the pixel electrode and the third vertical portion of the second data line.

An embodiment may be related to a liquid crystal display that includes the following elements: a first data line that transmits a data voltage of a first polarity and includes a first vertical portion, a first horizontal portion, a second vertical portion, and a first source electrode sequentially disposed along a second direction; a second data line that transmits a data voltage of a second polarity opposite to the first polarity and includes a third vertical portion, a second horizontal portion, a fourth vertical portion, and a second source electrode sequentially disposed along the second direction; and first and second pixel electrodes that are disposed between the first data line and the second data line, are adjacent to each other in a column direction, and are connected to different thin film transistors, in a plan view, wherein in the plan view, the first vertical portion of the first data line and the third vertical portion of the second data line may face each other with the first and second pixel electrodes therebetween; the second vertical portion of the first data line and the fourth vertical portion of the second data line may face each other with the first and second pixel electrodes therebetween; the first pixel electrode may overlap the second vertical portion of the first data line and the third vertical portion of the second data line; and the second pixel electrode may overlap the first vertical portion of the first data line and the fourth vertical portion of the second data line.

The first data line may further include a third horizontal portion disposed between the second vertical portion and the first source electrode and extending in the same direction as the first source electrode, and a fourth horizontal portion disposed between the first source electrode and the first vertical portion and extending in the same direction as the first source electrode.

The second data line may further include a fifth horizontal portion disposed between the fourth vertical portion and the second source electrode and extending in the same direction as the second source electrode, and a sixth horizontal portion disposed between the second source electrode and the third vertical portion and extending in the same direction as the second source electrode.

The first horizontal portion may overlap a horizontal stem portion of the first pixel electrode; the second horizontal portion may overlap a horizontal stem portion of the second pixel electrode; the third horizontal portion and the fourth horizontal portion may be disposed above and below the first source electrode and may not overlap the first pixel electrode, in a plan view; and the fifth horizontal portion and the sixth horizontal portion may be disposed above and below the second source electrode and may not overlap the second pixel electrode, in the plan view.

The first pixel electrode may be electrically connected to the first source electrode of the first data line, and the second pixel electrode may be electrically connected to the second source electrode of the second data line.

An embodiment may be related to a liquid crystal display. The liquid crystal display may include a first data line, a second data line, and a pixel electrode. The first data line may transmit a first data voltage. The second data line may transmit a second data voltage when the first data line transmits the first data voltage. A polarity of the second data voltage may be opposite to a polarity of the first data voltage. No data line analogous to the first data line or the second data line may be positioned between the first data line and the second data line. The pixel electrode may include a first branch electrode set, a second branch electrode set, a third branch electrode set, and a fourth branch electrode set. The first branch electrode set may be positioned between the first data line and the second data line in the first direction. The second branch electrode set may neighbor the first branch electrode set in a first direction and may overlap the second data line. The third branch electrode set may neighbor the first branch electrode set in a second direction different from the first direction and may overlap the first data line. The fourth branch electrode set may neighbor the third branch electrode set in the first direction, may neighbor the second branch electrode set in the second direction, and may be positioned between the first data line and the second data line in the first direction.

The pixel electrode may include a first-direction stem electrode, a first second-direction stem electrode, and a second second-direction stem electrode. The first-direction stem electrode may be lengthwise in the first direction and may be positioned between the first second-direction stem electrode and the second second-direction stem electrode in the second direction. The first second-direction stem electrode may be lengthwise in the second direction and may be positioned between the first branch electrode set and the second branch electrode set in the first direction. The second second-direction stem electrode may be lengthwise in the second direction, may be positioned between the third branch electrode set and the fourth branch electrode set in the first direction, and may be not aligned with the first second-direction stem electrode in the second direction.

A second edge of the first second-direction stem electrode and a first edge of the second second-direction stem electrode may be positioned between a first edge of the first second-direction stem electrode and a second edge of the second second-direction stem electrode in the first direction. A separation between the first edge of the first second-direction stem electrode and the second edge of the second second-direction stem electrode in the first direction may be substantially equal to a sum of a width of the first second-direction stem portion in the first direction and a width of the first data line in the first direction.

The first branch electrode set may be narrower than the second branch electrode set in the first direction. The third branch electrode set may be wider than the fourth branch electrode set in the first direction.

The liquid crystal display may include a first semiconductor. The first data line may include a first second-direction section lengthwise in the second direction, a second second-direction section lengthwise in the second direction, a first first-direction section lengthwise in the first direction and disposed between the first second-direction section and the second second-direction section, and a first source electrode electrically connected through the second second-direction section and the first first-direction section to the first second-direction section. The second data line may include a third second-direction section lengthwise in the second direction, a fourth second-direction section lengthwise in the second direction, a second first-direction section lengthwise in the first direction and disposed between the third second-direction section and the fourth second-direction section, and a second source electrode electrically connected through the fourth second-direction section and the second first-direction section to the third second-direction section. The pixel electrode may be electrically connected to the first source electrode through the first semiconductor. The first branch electrode set may be positioned between the first second-direction section and the third second-direction section in the first direction. The second branch electrode set may overlap the third second-direction section. The third branch electrode set may overlap the second second-direction section. The fourth electrode set may be positioned between the second second-direction section and the fourth second-direction section in the first direction.

The first first-direction section may overlap the first-direction stem electrode.

A maximum overlap of the second branch electrode set and the third second-direction section may be substantially equal to a maximum overlap of the third branch electrode set and the second second-direction section.

An overall area of the second branch electrode set may be substantially equal to an overall area of the third branch electrode set. An overall area of the first branch electrode set may be substantially equal to an overall area of the fourth branch electrode set.

Each of the overall area of the second branch electrode set and the overall area of the third branch electrode set may be larger than each of the overall area of the first branch electrode set and the overall area of the fourth branch electrode set.

An embodiment may be related to a liquid crystal display. The liquid crystal display may include a first data line, a second data line, and a pixel electrode. The first data line may transmit a first data voltage and may include a first second-direction section lengthwise in a second direction, a second second-direction section lengthwise in the second direction, a first first-direction section disposed between the first second-direction section and the second second-direction and lengthwise in a first direction different from the second direction, and a first source electrode electrically connected through the second second-direction section and the first first-direction section to the first second-direction section. The second data line may transmit a second data voltage when the first data line transmits the first data voltage. A polarity of the second data voltage may be opposite to a polarity of the first data voltage. The second data line may include a third second-direction section lengthwise in the second direction, a fourth second-direction section lengthwise in the second direction, a second first-direction section disposed between the third second-direction section and the fourth second-direction section and lengthwise in the first direction, and a second source electrode electrically connected through the fourth second-direction section and the second first-direction section to the third second-direction section. The pixel electrode may overlap each of the second second-direction section, the first first-direction section, the third second-direction section, and the second first-direction section without overlapping the first second-direction section or the fourth second-direction section.

The liquid crystal display may include a first semiconductor. The pixel electrode may be electrically connected to the first source electrode through the first semiconductor.

The pixel electrode may include a first-direction stem electrode lengthwise in the first direction. Each of the first first-direction section and the second first-direction section may overlap the first-direction stem electrode.

The pixel electrode may include a first second-direction stem electrode and a second second-direction stem electrode each lengthwise in the second direction. The first-direction stem section may be positioned between the first second-direction stem electrode and the second second-direction stem electrode in the second direction. The first second-direction stem section may be not aligned with the second second-direction stem section in the second direction.

A maximum overlap of the pixel electrode and the second second-direction section may be substantially equal to a maximum overlap of the pixel electrode and the third second-direction section.

An embodiment may be related to a liquid crystal display. The liquid crystal display may include a first data line, a second data line, a first pixel electrode, a second pixel electrode, a first semiconductor, a first pixel electrode, a second semiconductor, and a second pixel electrode. The first data line may transmit a first data voltage and may include a first second-direction section lengthwise in a second direction, a first first-direction section lengthwise in a first direction different from the second direction, a second second-direction section lengthwise in the second direction, and a first source electrode electrically connected through the second second-direction section and the first first-direction section sequentially to the first second-direction section. The second data line may transmit a second data voltage when the first data line transmits the first data voltage. A polarity of the second data voltage may be opposite to a polarity of the first data voltage. The second data line may include a third second-direction section lengthwise in the second direction, a second first-direction section lengthwise in the first direction, a fourth second-direction section lengthwise in the second direction, and a second source electrode electrically connected through the fourth second-direction section and the second first-direction section sequentially to the third second-direction section. The first pixel electrode may be electrically connected through the first semiconductor to the first source electrode and may overlap the second second-direction section without overlapping the first second-direction section. The second pixel electrode may neighbor the first pixel electrode in the second direction, may be electrically connected through the second semiconductor to the second source electrode, and may overlap the fourth second-direction section without overlapping the third second-direction section.

The first data line may include a third first-direction section and a fourth first-direction section each lengthwise in the first direction. The third first-direction section may be disposed between the second second-direction section and the first source electrode in the second direction and may be lengthwise in the first direction. The first source electrode may be disposed between the third first-direction section and the fourth first-direction section in the second direction.

The first pixel electrode may include a first first-direction stem electrode lengthwise in the first direction. The first first-direction section may overlap the first first-direction stem electrode. The second pixel electrode may include a second first-direction stem electrode lengthwise in the first direction. The second first-direction section may overlap the second first-direction stem electrode. The third first-direction section and the fourth first-direction section do not overlap the first pixel electrode.

The second data line may include a fifth first-direction section lengthwise in the first direction. The first pixel electrode may overlap the fifth first-direction section.

The first data line may include a fifth second-direction section lengthwise in the second direction and aligned with the second second-direction section in the second direction. The second pixel electrode may overlap the fifth second-direction section.

DETAILED DESCRIPTION

Example embodiments are described with reference to the accompanying drawings. The described embodiments may be modified in various ways, all without departing from the scope of the present disclosure.

Like reference numerals may designate like elements throughout the specification.

In the drawings, dimensions of elements may be exaggerated for clarity.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except for environmental elements such as air) present between the first element and the second element.

Unless explicitly described to the contrary, the words "comprise" and "include," and variations such as "comprises" or "comprising," may indicate the inclusion of stated elements but not the exclusion of any other elements.

The term "liquid crystal display" may mean "liquid crystal display device." The term "connect" may mean "electrically connect" or "electrically connect through no intervening transistors." The term "conductive" may mean "electrically conductive." The term "insulate" may mean "electrically insulate" or "electrically isolate." The term "horizontal" may mean a first direction and may correspond to a lengthwise direction of an element; the term "vertical" may mean a second direction different from the first direction and may correspond to a lengthwise direction of another element. The expression that an element is lengthwise in a particular direction may mean that the lengthwise direction of the element is (in) the particular direction. The expression that an element extends in a particular direction may mean that the lengthwise direction of the element is (in) the particular direction. The term "portion" may mean "section (that is directly connected to another section having a different orientation or different lengthwise direction)." The expression "diagonally disposed to each other" may mean "arranged in/along a diagonal/oblique direction relative to a particular direction (e.g., a horizontal direction)." The term "sub-region" may mean or correspond to "branch electrode set (including branch electrodes that are oblique relative to a stem electrode)." The term "adjacent" may mean "closest" or "immediately neighboring." The term "stem portion" may mean "stem electrode."

Figure 1:
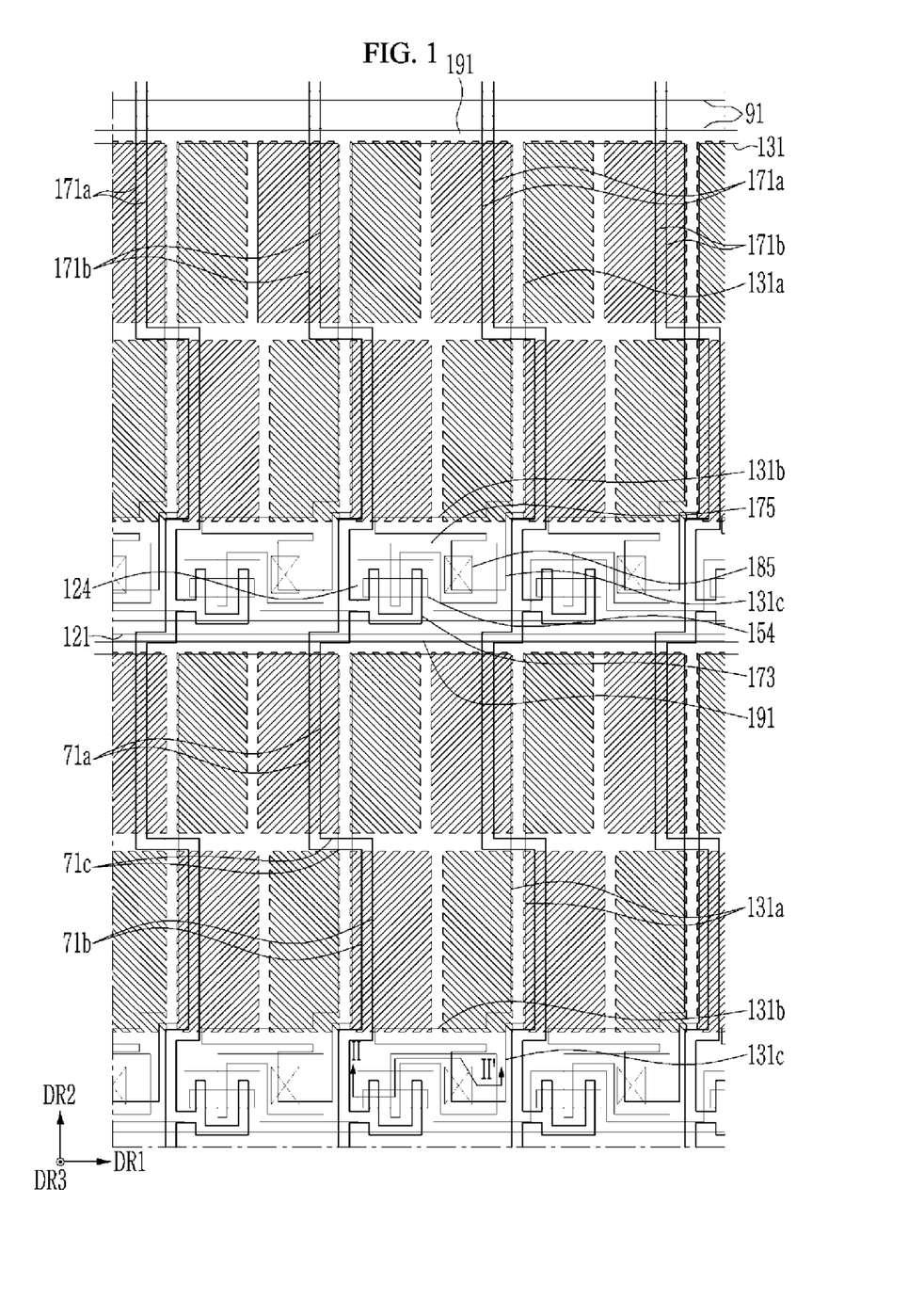
FIG. 1 illustrates a layout diagram (or plan view) of a liquid crystal display according to an embodiment.
Figure 2:
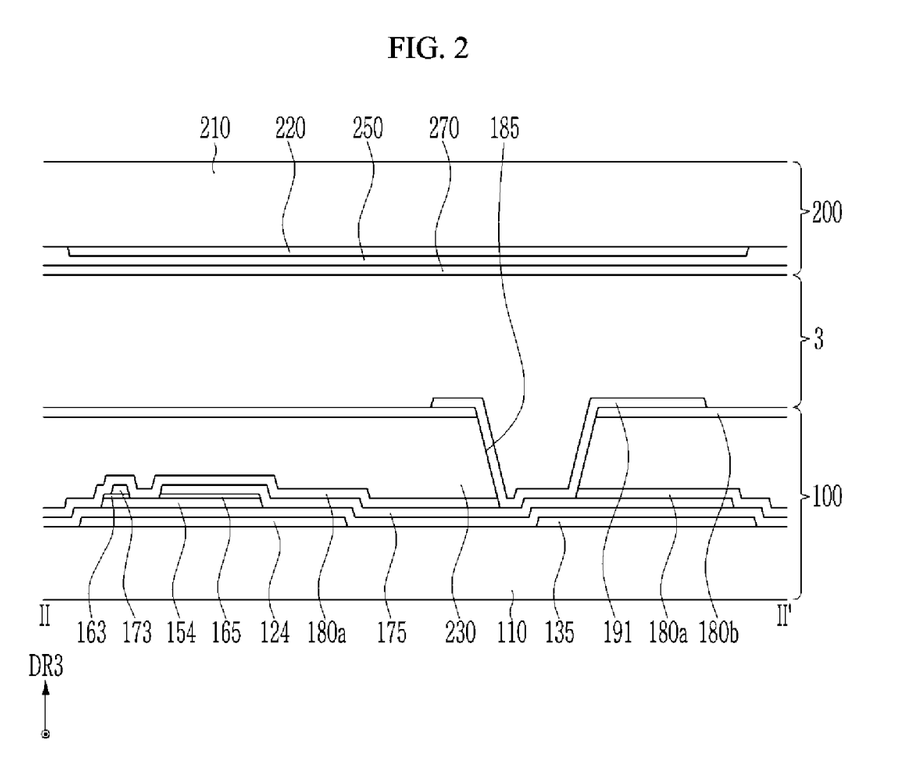
FIG. 2 illustrates a cross-sectional view taken along line II-II' of FIG. 1 according to an embodiment.

FIG. 1 illustrates a layout diagram of a liquid crystal display according to an embodiment, and FIG. 2 illustrates a cross-sectional view taken along line II-II' of FIG. 1 according to an embodiment.

Referring to FIG. 1 and FIG. 2, the liquid crystal display includes a first display panel 100, a second display panel 200 overlapping the first display panel 100, and a liquid crystal layer 3 disposed between the panels 100 and 200.

The first display panel 100 includes a first substrate 110. The first substrate 110 may be made of transparent glass or plastic.

A plurality of gate lines 121 and a plurality of storage electrode lines 131 are disposed on the first substrate 110. The plurality of gate lines 121 and the plurality of storage electrode lines 131 may be simultaneously formed through the same process, and may include (and/or be formed of) the same material.

Each gate line 121 transmits a gate signal, extends in a first direction DR1, and includes a plurality of gate electrodes 124.

Each storage electrode line 131 extends in the first direction DR1 in parallel to the gate lines 121. The first storage electrode 131a extends from the storage electrode line 131 along a second direction DR2, the second storage electrode 131b extends from the first storage electrode 131a along the first direction DR1, and the third storage electrode 131c extends from the first storage electrode 131a toward a contact hole 185.

A gate insulating film 140 is disposed on the plurality of gate lines 121 and the plurality of storage electrode lines 131. The gate insulating film 140 may include silicon oxide or silicon nitride. The gate insulating film 140 may have a multi-layered structure including at least two insulating layers having different physical properties.

A semiconductor 154 is disposed on the gate insulating film 140. The semiconductor 154 may overlap the gate electrode 124.

The semiconductor 154 may include a polysilicon or oxide semiconductor. The oxide semiconductor may be at least one of an oxide based on titanium (Ti), hafnium (Hf), zirconium (Zr), aluminum (Al), tantalum (Ta), germanium (Ge), zinc (Zn), gallium (Ga), tin (Sn), or indium (In), and a complex oxide of one or more of the above metals.

Ohmic contact members 163 and 165 may be disposed on the semiconductor 154.

The ohmic contact members 163 and 165 may be made of n+ hydrogenated amorphous silicon doped with a high concentration of n-type impurities such as phosphorus, or may be made of a silicide. The ohmic contact members 163 and 165 may be optional, and in this case, a portion of the semiconductor 154 may be doped with impurities.

A plurality of first data lines 171a, a plurality of second data lines 171b, and a plurality of drain electrodes 175 are disposed on the gate insulating film 140 and the ohmic contact members 163 and 165.

The first data lines 171a and the second data lines 171b may be alternately arranged. The first data lines 171a may transmit data voltages of a first polarity (e.g., positive polarity or negative polarity) when the second data lines 171b transmit data voltages of a second polarity (e.g., negative polarity or positive polarity) opposite to the polarity.

The first data line 171a and the second data line 171b each include a first vertical portion 71a and a second vertical portion 71b extending along/in the second direction DR2 and a horizontal portion 71c between the first vertical portion 71a and the second vertical portion 71b parallel to (or extending in) the first direction DR1.

Each of the first data line 171a and the second data line 171b includes source electrodes 173 overlapping gate electrodes 124 and each having a substantially U-shape.

The second vertical portion 71b may overlap the corresponding pixel electrode 191 (which may be electrically connected to the corresponding source electrode 173 through a corresponding semiconductor 154) and the first vertical portion 71a may overlap an adjacent pixel electrode 191. The first vertical portion 71a, the horizontal portion 71c, the second vertical portion 71b, and the source electrode 173 may be sequentially disposed along the second direction DR2.

A gate electrode 124, a source electrode 173, and a drain electrode 175 may form one thin film transistor (TFT) together with a semiconductor 154, and a channel of the thin film transistor is formed in the semiconductor 154 between the source electrode 173 and the drain electrode 175.

A first passivation film 180a is disposed on the plurality of first data lines 171a and the plurality of second data lines 171b, the plurality of drain electrodes 175, the gate insulating film 140, and the exposed semiconductor 154. The first passivation film 180a may include silicon nitride or silicon oxide.

Color filters 230 are disposed on the first passivation film 180a. The first passivation film 180a may prevent a pigment of the color filter 230 from flowing into the exposed portion of the semiconductor 154.

A color filter 230 may include a red color filter, a green color filter, or a blue color filter. Respective color filters 230 may be disposed in regions divided by intersections of the gate lines 121 and the data lines 171a and 171b.

A second passivation film 180b is disposed on the color filter 230.

The second passivation film 180b may include an inorganic insulating material such as silicon nitride or silicon oxide, an organic insulating material, or a low dielectric constant insulating material. The second passivation film 180b may prevent the color filter 230 from being lifted and may protect the liquid crystal layer 3 from being polluted due to an organic material, such as a solvent inflowing from the color filter 230, thereby preventing defects such as an afterimage.

Contact holes 185 exposing the drain electrodes 175 may be formed in the first passivation film 180a, the color filter 230, and the second passivation film 180b.

Pixel electrodes 191 are disposed on the second passivation film 180b. A pixel electrode 191 is formed on the first passivation film 180a, the color filter 230, and the second passivation film 180b, and may be physically and electrically connected to the corresponding drain electrode 175 through the corresponding contact hole 185 overlapping the drain electrode 175. The pixel electrode 191 receives a data voltage through the drain electrode 175.

A pixel electrode 191 may include a transparent conductor such as ITO or IZO. A pixel electrode 191 may be electrically connected to the source electrode 173 of one of the closest first data line 171a and the closest second data line 171b, may overlap the second vertical portion 71b of the first data line 171a or the second data line 171b electrically connected to the pixel electrode 191, and may overlap the first vertical portion 71a of the second data line 171b or the first data line 171a not connected to the pixel electrode 191.

The pixel electrode 191 electrically connected to the source electrode 173 of the closest first data line 171a overlaps the second vertical portion 71b of the first data line 171a, and overlaps the first vertical portion 71a of the closest second data line 171b. The pixel electrode 191 electrically connected to the source electrode 173 of the second data line 171b overlaps the second vertical portion 71b of the second data line 171b, and overlaps the first vertical portion 71a of the adjacent first data line 171a.

A pixel electrode 191 overlaps a first vertical portion 71a and a second vertical portion 71b of the nearest first data line 171a and the nearest second data line 171b that simultaneously apply data voltages of different/opposite polarities, and a maximum overlap of/between a pixel electrode 191 and the corresponding first vertical portion 71a may be substantially equal to a maximum overlap of/between the pixel electrode 191 and the corresponding second vertical portion 71b. As a result, the parasitic capacitances are substantially equal, so unwanted influences of the parasitic capacitance may be offset and/or mitigated.

Advantageously, it is possible to charge a desired data voltage the pixel electrode, and it is possible to prevent a crosstalk failure caused by a deviation of the parasitic capacitances. In embodiments, by configuring the pixel electrode 191 to overlap the two data lines 171a and 171b, the aperture ratio of the liquid crystal display may be maximized.

The liquid crystal display may have an ultra-high resolution, e.g., for displaying an 8K image having a resolution of 7680×4320. In the liquid crystal display, an interval between two adjacent data lines may be in a range of about 60 μm to about 75 μm.

Generally, in order to reduce the influence of parasitic capacitance between the pixel electrode and the data line, the interval/space between the pixel electrode and the data line is sufficiently large, and a common voltage may be applied to a shielding electrode overlapping the data line. In this case, a size of the pixel electrode may be very small, such that the aperture ratio of the liquid crystal display device may be undesirably small.

According to embodiments, the pixel electrode of the liquid crystal display overlaps the data line and may have a sufficiently large size to maintain a desirable aperture ratio. At the same time, by overlapping the pixel electrode and the portions of the two data lines (to which the voltages of different polarities are applied) with equal overlapping areas, it is possible to charge a desired data voltage to the pixel electrode.

The second display panel 200 includes a second substrate 210. The second substrate 210 may be made of transparent glass or plastic.

A light blocking member 220 is disposed on a surface of the second substrate 210 close to the liquid crystal layer 3.

The light blocking member 220 may have an opening exposing the pixel electrode 191 of the first display panel 100. The light blocking member 220 may mostly overlap the gate line 121, the storage voltage line 131, and the data lines 171a and 171b.

An overcoat 250 is disposed between the light blocking member 220 and the liquid crystal layer 3. The overcoat 250 may be optional in some embodiments. A common electrode 270 is disposed between the overcoat 250 and the liquid crystal layer 3 in the third direction DR3 (or thickness direction of the liquid crystal display). The common electrode 270 may receive a common voltage from a voltage source.

The liquid crystal layer 3 includes liquid crystal molecules (not shown).

The pixel electrode 191 (to which a data voltage is applied) generates an electric field together with the common electrode 270 to control orientations of liquid crystal molecules of the liquid crystal layer 3 between the two electrodes 191 and 270. Transmission of light passing through the liquid crystal layer 3 is controlled by the orientations of the liquid crystal molecules. The pixel electrode 191 and the common electrode 270 form a liquid crystal capacitor together with a portion of the liquid crystal layer 3 to maintain the applied voltage even after a thin film transistor is turned off.

Figure 3:
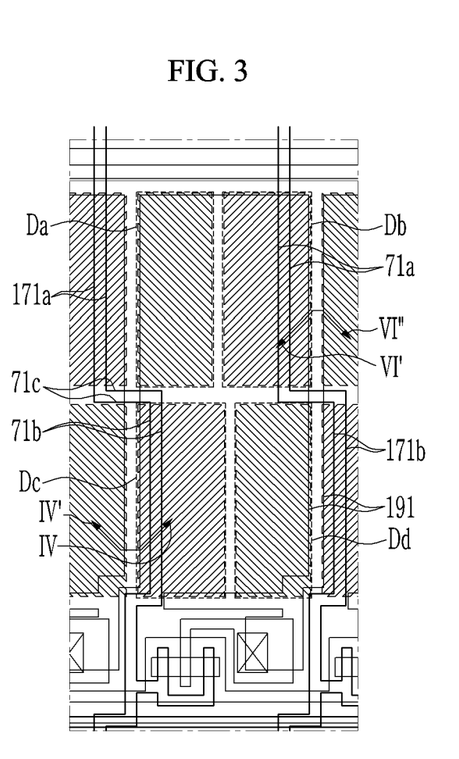
FIG. 3 illustrates a layout view of one pixel of the liquid crystal display of FIG. 1 according to an embodiment.
Figure 4:
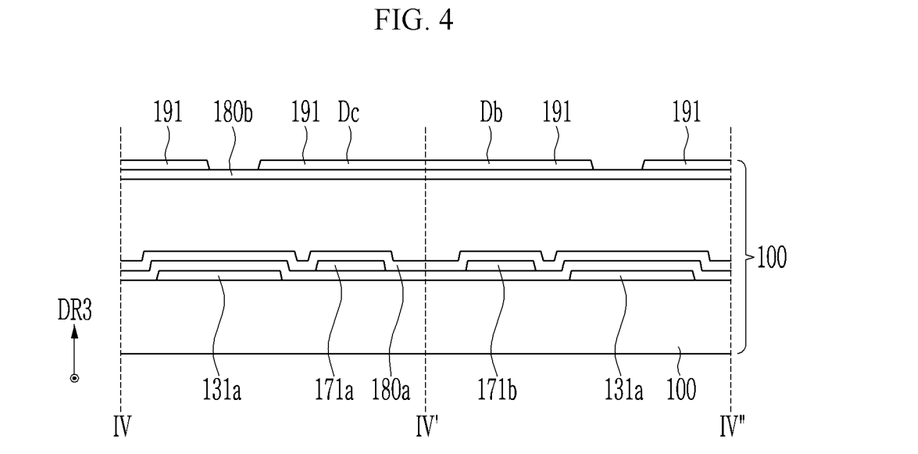
FIG. 4 illustrates a cross-sectional view taken along line IV-IV' and line VI'-VI" of FIG. 3 according to an embodiment.
Figure 5:
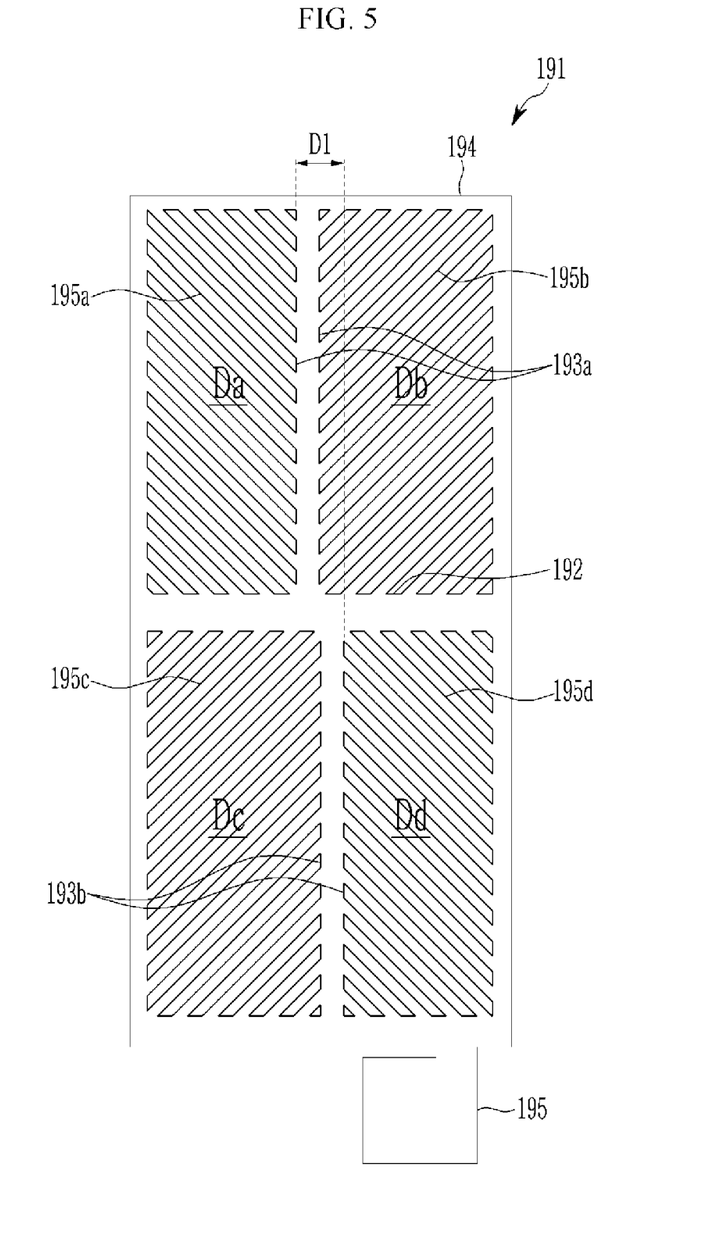
FIG. 5 illustrates a layout view of a pixel electrode of the liquid crystal display of FIG. 1 according to an embodiment.

FIG. 3 illustrates a layout view of one pixel of the liquid crystal display of FIG. 1 according to an embodiment. FIG. 4 illustrates a cross-sectional view taken along lines IV-IV' and VI'-VI" of FIG. 3 according to an embodiment. FIG. 5 illustrates a layout view of a pixel electrode of the liquid crystal display of FIG. 1 according to an embodiment.

FIG. 3 illustrates two data lines 171a and 171b adjacent/closest to the pixel electrode 191 electrically connected to the source electrode 173 of the first data line 171a.

Referring to FIG. 3 and FIG. 4, the pixel electrode 191 overlaps the second vertical portion 71b of the first data line 171a, and overlaps the first vertical portion 71a of the adjacent second data line 171b.

A/the maximum overlap of/between the pixel electrode 191 and the second vertical portion 71b of the first data line 171a may be substantially equal to a/the maximum overlap of/between the pixel electrode 191 and the first vertical portion 71a of the second data line 171b.

The overlapping areas of the first data line 171a and the second data line 171b (applying two data voltages having different/opposite polarities) with the pixel electrode 191 are substantially equal to each other, and thus the corresponding parasitic capacitances are substantially equal to each other, so the influences of the parasitic capacitances may be desirably offset or canceled.

Therefore, it is possible to charge a desired data voltage the pixel electrode, and it is possible to prevent a crosstalk failure potentially caused by unequal parasitic capacitances. In addition, because the pixel electrode 191 overlaps the two data lines 171a and 171b, the aperture ratio of the liquid crystal display may be maximized.

Referring to FIG. 3 and FIG. 5, each pixel electrode 191 includes a horizontal stem portion 192 extending in the first direction DR1, a first vertical stem portion 193a and a second vertical stem portion 193b extending upward and downward along the second direction DR2 from the horizontal stem portion, and an outer stem portion 194 surrounding an outer edge of the pixel electrode and extending from the horizontal stem portion 192, the first vertical stem portion 193a, and the second vertical stem portion 193b. In addition, the pixel electrode 191 includes a plurality of first branch electrodes 195a, a plurality of second branch electrodes 195b, a plurality of third branch electrodes 195c, and a plurality of fourth branch electrodes 195d extending obliquely from the horizontal stem portion 192, the first vertical stem portion 193a, the second vertical stem portion 193b, and the outer stem portion 194.

The pixel electrode 191 is divided into a first sub-region Da, a second sub-region Db, a third sub-region Dc, and a fourth sub-region Dd by the horizontal stem portion 192, the first vertical stem portion 193a, and the second vertical stem portion 193b.

When a data voltage is applied to the pixel electrode 191 and a common voltage is applied to the common electrode 270, edges of the plurality of first branch electrodes 195a, the plurality of second branch electrodes 195b, the plurality of third branch electrodes 195c, and the plurality of fourth branch electrodes 195d of the pixel electrode 191 distort an electric field to generate a horizontal component perpendicular to sides of the plurality of branch electrodes 195a, 195b, 195c, and 195d, and an inclination direction of the liquid crystal molecules is determined in a direction determined by the horizontal component. Accordingly, the liquid crystal molecules first tend to incline in the direction perpendicular to the sides of the plurality of branch electrodes 195a, 195b, 195c, and 195d. However, since distances between the plurality of adjacent branch electrodes 195a, 195b, 195c, and 195d are narrow, the liquid crystal molecules to be inclined in opposite directions are inclined together in a direction parallel to a longitudinal direction of the plurality of branch electrodes 195a, 195b, 195c, and 195d.

The pixel electrode 191 includes four sub-regions Da, Db, Dc, and Dd in which lengthwise directions of neighboring pairs of the plurality of first branch electrodes 195a, the plurality of second branch electrodes 195b, the plurality of third branch electrodes 195c, and the plurality of fourth branch electrodes 195d are different, and the inclination directions of the liquid crystal molecules of the liquid crystal layer 3 are in four directions. When the liquid crystal molecules are inclined in various directions, a reference viewing angle of the liquid crystal display is increased.

Among the four sub-regions Da, Db, Dc, and Dd of the pixel electrode 191, the second sub-region Db overlaps the second data line 171b, and the third sub-region Dc overlaps the first data line 171a. That is, two sub-regions Db and Dc of the four sub-regions Da, Db, Dc, and Dd of the pixel electrode 191 diagonally disposed to each other overlap portions of the data lines 171a and 171b, and the other two sub-regions Da and Dd of the four sub-regions Da, Db, Dc, and Dd of the pixel electrode 191 diagonally disposed to each other do not overlap the data lines 171a and 171b.

Areas of the second sub-region Db and the third sub-region Dc that respectively overlap the data lines 171a and 171b may be equal to each other, and areas of the first sub-region Da and the fourth sub-region Dd that do not overlap the data lines 171a and 171b may be substantially equal to each other. Areas of the second sub-region Db and the third sub-region Dc may be larger than areas of the first sub-region Da and the fourth sub-region Dd. Accordingly, areas of the four sub-regions Da, Db, Dc, and Dd, except for portions overlapping the data lines 171a and 171b, may be substantially equal.

The first vertical stem portion 193a and the second vertical stem portion 193b of the pixel electrode 191 are not aligned in the second direction DR2.

A farthest distance/separation D1 (in the first direction DR1) between a farther DR2 edge of the first vertical stem portion 193a and a farther DR2 edge of the second vertical stem portion 193b may be substantially equal to a sum of a width of the first vertical stem portion 193a in the first direction DR1 and a width of the data line 171a/171b in the first direction DR1. The width of the first vertical stem portion 193a and a width of the second vertical stem portion 193b may be equal. The width of each of the data lines 171a and 171b may be about 4 μm.

The horizontal portions 71c of the data lines 171a and 171b overlap the horizontal stem portion 192 of the pixel electrode 191. Thus, it is possible to prevent the aperture ratio of the liquid crystal display from being decreased by the horizontal portions 71c of the data lines 171a and 171b.

In the liquid crystal display, the pixel electrode 191 includes the four sub-regions Da, Db, Dc, and Dd, the areas of the second sub-region Db and the third sub-region Dc overlapping the data lines 171a and 171b may be substantially equal to each other, and the areas of the first sub-region Da and the fourth sub-region Dd that do not overlap the data lines 171a and 171b may be substantially equal to each other. In addition, the areas of the second sub-region Db and the third sub-region Dc may be larger than the areas of the first sub-region Da and the fourth sub-region Dd. Accordingly, the areas of the four sub-regions Da, Db, Dc, and Dd, except for portions thereof overlapping the data lines 171a and 171b, may be substantially the same, and a difference in visibility may be reduced when viewed from various directions.

Figure 6:
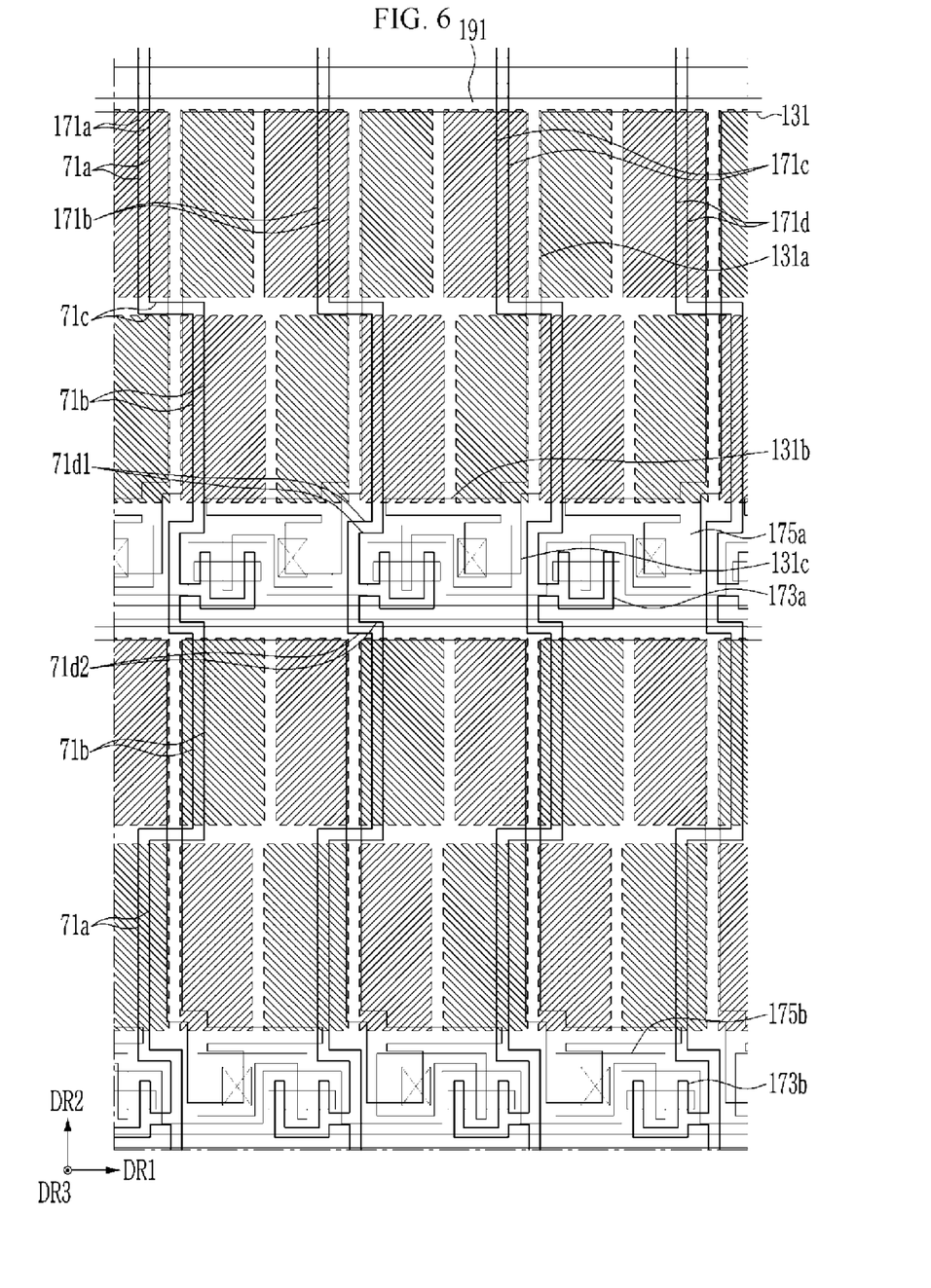
FIG. 6 illustrates a layout diagram of a liquid crystal display according to an embodiment.

FIG. 6 illustrates a layout diagram of a liquid crystal display according to an embodiment.

Referring to FIG. 6, some features of the liquid crystal display illustrated in FIG. 6 are identical to or similar to some features of the liquid crystal display described above with reference to FIG. 1 to FIG. 5.

Referring to FIG. 6 together with FIG. 1 to FIG. 5, unlike the liquid crystal display illustrated in FIG. 1, in the liquid crystal display illustrated in FIG. 6, two pixel electrodes 191 adjacent to each other in the second direction DR2 are respectively electrically connected to the source electrode 173 of the first data line 171a and to the source electrodes 173 of the second data line 171b. According to the liquid crystal display illustrated in FIG. 1, all of the pixel electrodes 191 in the same pixel electrode column along the second direction DR2 are electrically connected to source electrodes of the same data line.

According to the embodiment illustrated in FIG. 6, the data line 171 is driven by column inversion. In an embodiment, the pixel may be driven with dot inversion.

In the liquid crystal display device according to FIG. 6, the first data line 171a and the second data line 171b transmitting data voltages of different polarities may be alternately arranged, similar to the liquid crystal display illustrated in FIG. 1.

The first data line 171a and the second data line 171b each include two second vertical portions 71b positioned between two first vertical portions 71a along the second direction DR2 with no intervening first vertical portion 71a, and each include the horizontal portion 71c parallel to the first direction DR1.

In addition, each of the first data line 171a and the second data line 171b further includes a first horizontal portion 71d1 and a second horizontal portion 71d2 that protrude along the first direction DR1 like the source electrode 173 and are disposed above and below the source electrode 173 along the second direction DR2.

The horizontal portion 71c is disposed between the first vertical portion 71a and the second vertical portion 71b of the data lines 171a and 171b along/in the second direction DR2 and/or the first direction DR1, and the first horizontal portion 71d1, the second horizontal portion 71d2, and the source electrode 173 may be disposed between the second vertical portion 71b and the first vertical portion 71a and/or between two neighboring second vertical portions 71b.

In the liquid crystal display illustrated in FIG. 6, the pixel electrode 191 electrically connected to the source electrode 173 of the first data line 171a overlaps the second vertical portion 71b of the first data line 171a, and overlaps the first vertical portion 71a of the adjacent second data line 171b. The pixel electrode 191 electrically connected to the source electrode 173 of the second data line 171b overlaps the second vertical portion 71b of the second data line 171b, and overlaps the first vertical portion 71a of an adjacent first data line 171a.

Each pixel electrode 191 overlaps both a first vertical portion 71a and a second vertical portion 71b of the closest first data line 171a and the closest second data line 171b (which apply data voltages of different/opposite polarities), and the maximum overlapping area of the pixel electrode 191 and the first vertical portion 71a may be substantially equal to the maximum overlapping area of the pixel electrode 191 and the second vertical portion 71b. As a result, the corresponding parasitic capacitances are substantially equal to each other, so the influences may be offset or canceled.

Therefore, it is possible to charge a desirable data voltage to the pixel electrode, and it is possible to prevent a crosstalk failure potentially caused by substantially unequal parasitic capacitances. In addition, because the pixel electrode 191 overlaps the two data lines 171a and 171b, the aperture ratio of the liquid crystal display may be maximized.

Referring to FIG. 5 together with FIG. 6, among the four sub-regions Da, Db, Dc, and Dd of the pixel electrode 191, two sub-regions diagonally disposed to each other overlap portions of the first data line 171a and the second data line, and among the four sub-regions Da, Db, Dc, and Dd, the remaining two sub-regions diagonally disposed to each other do not overlap the first data line 171a and the second data line 171b.

Among the four sub-regions Da, Db, Dc, and Dd of the two adjacent pixel electrodes 191 along the second direction DR2, the sub-regions overlapping the first data line 171a and the second data line 171b may be different.

For example, among the four sub-regions Da, Db, Dc, and Dd of the pixel electrode 191 electrically connected to the source electrode 173b of the second data line 171b, the second sub-region Db and the third sub-region Dc diagonally disposed to each other overlap the second vertical portion 71b of the second data line 171b and the first vertical portion 71a of the adjacent first data line 171a, and the first sub-region Da and the fourth sub-region Dd diagonally disposed to each other do not overlap the first data line 171a and the second data line 171b.

In the pixel electrode 191 disposed below along the second direction DR2 and electrically connected to the source electrode 173*a* of the first data line 171*a*, among the four sub-regions Da, Db, Dc, and Dd, the first sub-region Da and the fourth sub-region Dd diagonally disposed to each other overlap the second vertical portions 71*b* of the first data line 171*a* and the first vertical portion 71*a* of the adjacent second data line 171*b*, and the second sub-region Db and the third sub-region Dc diagonally disposed do not overlap the first data line 171*a* and the second data line 171*b*.

The areas of the two sub-regions overlapping the data lines 171*a* and 171*b* may be substantially equal, and the areas of the two sub-regions not overlapping the data lines 171*a* and 171*b* may be substantially equal. In addition, the areas of the two sub-regions overlapping the data lines 171*a* and 171*b* may be larger than the areas of the two sub-regions not overlapping the data lines 171*a* and 171*b*. Accordingly, areas of the four sub-regions Da, Db, Dc, and Dd, except for portions thereof overlapping the data lines 171*a* and 171*b*, may be substantially equal.

The first vertical stem portion 193*a* and the second vertical stem portion 193*b* disposed above and below the horizontal stem portion 192 of the pixel electrode 191 are not aligned in the second direction DR2.

A farthest distance D1 (in the first direction DR1) between a farther DR2 edge of the first vertical stem portion 193*a* and a farther DR2 edge of the second vertical stem portion 193*b* may be substantially equal to a sum of a width of the first vertical stem portion 193*a* in the first direction DR1 and a width of the data line 171*a*/171*b* in the first direction DR1. The width of the first vertical stem portion 193*a* and a width of the second vertical stem portion 193*b* may be equal.

The horizontal portions 71*c* of the data lines 171*a* and 171*b* overlap the corresponding horizontal stem portion 192 of the pixel electrode 191. Thus, it is possible to prevent the aperture ratio of the liquid crystal display from being decreased by the horizontal portions 71*c* of the data lines 171*a* and 171*b*.

Some features of the liquid crystal display described above with reference to FIG. 1 to FIG. 5 may be applied to the liquid crystal display illustrated in FIG. 6.

While example embodiments have been described, practical embodiments are not limited to the described embodiments. Practical embodiments are intended to cover various modifications and equivalent arrangements within the scope of the appended claims.

What is claimed is:

1. A liquid crystal display, comprising:
a first data line and a second data line that transmit data voltages of different polarities and are disposed adjacent to each other;
the first data line and the second data line extend in a second direction;
each of the first data line and the second data line include a first vertical portion and a second vertical portion extending in the second direction, and include a horizontal portion extending in a first direction different from the second direction and disposed between the first vertical portion and the second vertical portion; and
a pixel electrode disposed between the first data line and the second data line in a plan view, including stems respectively parallel to sections of the first data line, and including four sub-regions divided by the stems,
wherein among the four sub-regions of the pixel electrode, two sub-regions diagonally disposed to each other are respectively larger than the remaining two sub-regions and respectively overlap a portion of the first vertical portion of the second data line and a portion of the second vertical portion of the first data line; and
the remaining two sub-regions do not overlap the first data line and the second data line.

2. The liquid crystal display of claim 1, wherein
the pixel electrode includes: a horizontal stem portion extending in a first direction;
a first vertical stem portion and a second vertical stem portion extending upward and downward from the horizontal stem portion in a direction parallel to a second direction different from the first direction;
an outer stem portion extending from the horizontal stem portion and the first vertical stem portion and the second vertical stem portion to be disposed at an outer portion of the pixel electrode; and
a first branch electrode, a second branch electrode, a third branch electrode, and a fourth branch electrode that are disposed between the horizontal stem portion, the first vertical stem portion, the second vertical stem portion, and the outer stem portion and extend in different directions, and
the first vertical stem portion and the second vertical stem portion are not aligned in a line along the second direction, but are misaligned.

3. The liquid crystal display of claim 2, wherein
a separation distance between a first line connecting an edge of the first vertical stem portion along the second direction and a second line connecting an edge of the second vertical stem portion along the second direction is substantially equal to a sum of a width of the first vertical stem portion and a width of the first data line.

4. The liquid crystal display of claim 2, wherein:
the four sub-regions include a first sub-region including the first branch electrode a second sub-region including the second branch electrode, a third sub-region including the third branch electrode, and a fourth sub-region including the fourth branch electrode;
the first sub-region and the fourth sub-region are diagonally disposed to each other; and
the second sub-region and the third sub-region are diagonally disposed to each other.

5. The liquid crystal display of claim 4, wherein:
the pixel electrode is electrically connected to a source electrode of the second data line.

6. The liquid crystal display of claim 5, wherein
the horizontal portion overlaps the horizontal stem portion.

7. The liquid crystal display of claim 5, wherein
an overlapping area of the second sub-region and the first vertical portion of the second data line is substantially the same as that of the third sub-region and the second vertical portion of the first data line.

8. The liquid crystal display of claim 5, wherein:
an area of the second sub-region and an area of the third sub-region are substantially the same; and
an area of the first sub-region and an area of the fourth sub-region are substantially the same.

9. The liquid crystal display of claim 8, wherein
each of the second sub-region and the third sub-region is larger than each of the first sub-region and the fourth sub-region.

10. A liquid crystal display, comprising:
a first data line that transmits a data voltage of a first polarity and includes a first vertical portion and a second vertical portion, a first horizontal portion electrically connected between the first vertical portion and the second vertical portion, and a first source electrode;

a second data line that transmits a data voltage of a second polarity opposite to the first polarity and includes a third vertical section and a fourth vertical section, a second horizontal portion electrically connected between the third vertical portion and the fourth vertical portion, and a second source electrode; and a pixel electrode including a horizontal stem and including a first vertical stem and a second vertical stem that respectively extend upward and downward from the horizontal stem in a plan view, wherein in the plan view, the first vertical portion of the first data line and the third vertical portion of the second data line face each other with the first vertical stem of the pixel electrode therebetween; the second vertical portion of the first data line and the fourth vertical portion of the second data line face each other with the second vertical stem of the pixel electrode therebetween;

the pixel electrode overlaps the second vertical portion of the first data line and the third vertical portion of the second data line; and the first vertical stem and the second vertical stem are not aligned with each other in the plan view.

11. The liquid crystal display of claim 10, wherein the pixel electrode is electrically connected to the first source electrode of the first data line.

12. The liquid crystal display of claim 10, wherein the first horizontal portion and the second horizontal portion overlap a horizontal stem portion of the pixel electrode.

13. The liquid crystal display of claim 12, wherein an overlapping area of the pixel electrode and the second vertical portion of the first data line is substantially the same as that of the pixel electrode and the third vertical portion of the second data line.

14. The liquid crystal display of claim 10, wherein an overlapping area of the pixel electrode and the second vertical portion of the first data line is substantially the same as that of the pixel electrode and the third vertical portion of the second data line.

15. A liquid crystal display, comprising:

a first data line that transmits a data voltage of a first polarity and includes a first vertical portion, a first horizontal portion, a second vertical portion, and a first source electrode sequentially disposed along a second direction;

a second data line that transmits a data voltage of a second polarity opposite to the first polarity and includes a third vertical portion, a second horizontal portion, a fourth vertical portion, and a second source electrode sequentially disposed along the second direction; and first and second pixel electrodes that are disposed between the first data line and the second data line, are adjacent to each other in a column direction, and are connected to different thin film transistors, in a plan view, wherein in the plan view, the first vertical portion of the first data line and the third vertical portion of the second data line face each other with the first and second pixel electrodes therebetween, the second vertical portion of the first data line and the fourth vertical portion of the second data line face each other with the first and second pixel electrodes therebetween;

the first pixel electrode overlaps the second vertical portion of the first data line and the third vertical portion of the second data line;

the second pixel electrode overlaps the first vertical portion of the first data line and the fourth vertical portion of the second data line; and the first data line further includes a third horizontal portion and a fourth horizontal portion parallel to each other, spaced from each other in the second direction, and both electrically connected between the second vertical portion and the first source electrode.

16. The liquid crystal display of claim 15, wherein the second data line further includes a fifth horizontal portion and a sixth horizontal portion parallel to each other, spaced from each other in the second direction, and both electrically connected between the fourth vertical portion and the second source electrode.

17. The liquid crystal display of claim 16, wherein:
the first horizontal portion overlaps a horizontal stem portion of the first pixel electrode;
the second horizontal portion overlaps a horizontal stem portion of the second pixel electrode;
the third horizontal portion and the fourth horizontal portion do not overlap the first pixel electrode, in a plan view; and
the fifth horizontal portion and the sixth horizontal portion do not overlap the second pixel electrode, in the plan view.

18. The liquid crystal display of claim 17, wherein the first pixel electrode is electrically connected to the first source electrode of the first data line, and the second pixel electrode is electrically connected to the second source electrode of the second data line.

19. The liquid crystal display of claim 15, wherein the first pixel electrode is electrically connected to the first source electrode of the first data line, and the second pixel electrode is electrically connected to the second source electrode of the second data line.

\* \* \* \* \*